No. 800,162.  PATENTED SEPT. 26, 1905.
A. J. KOOB.
DUMPING WAGON.
APPLICATION FILED MAY 4, 1905.
2 SHEETS—SHEET 1.
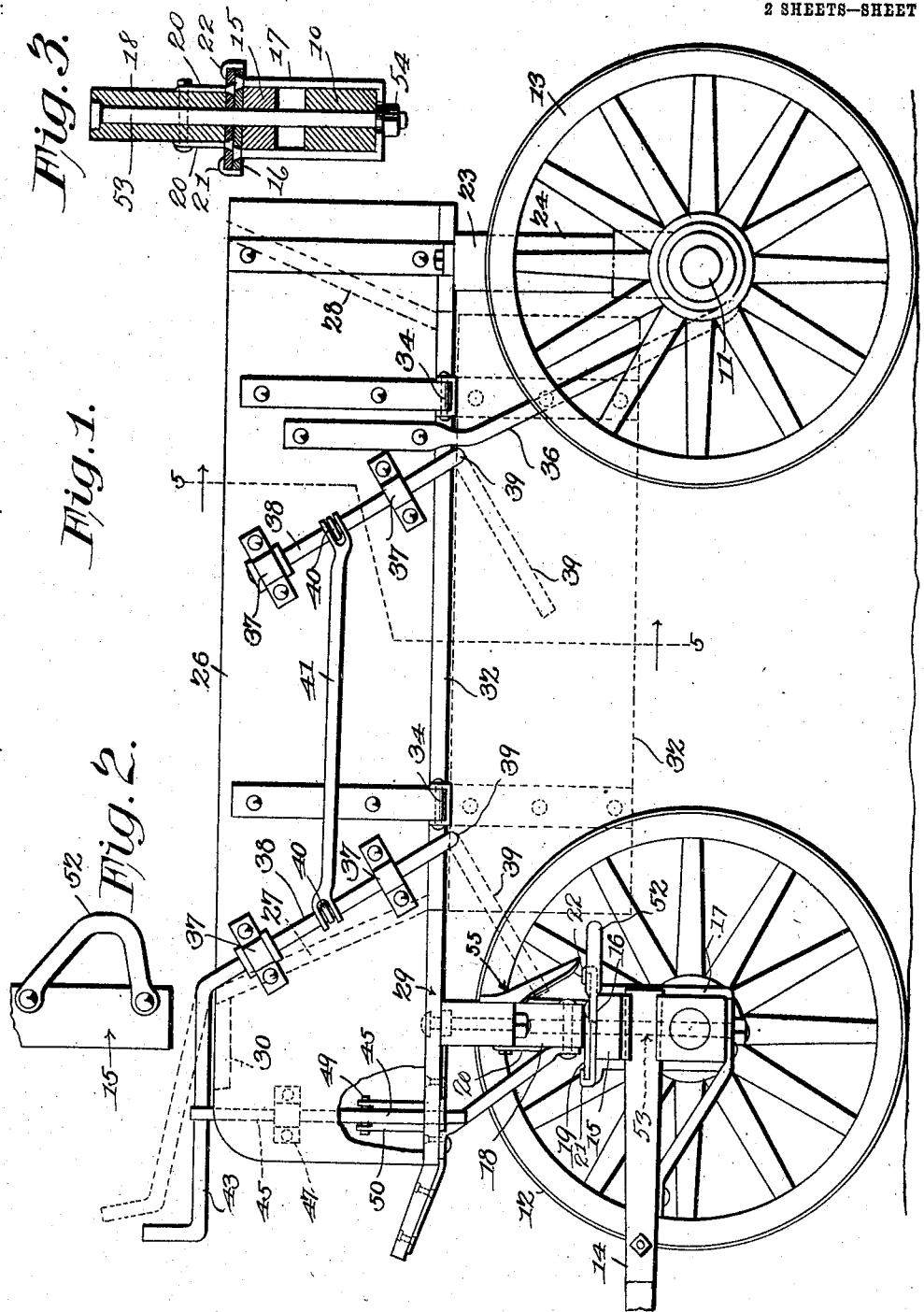
Witnesses  Adam J. Koob, Inventor
by C. A. Snow & Co.
Attorneys

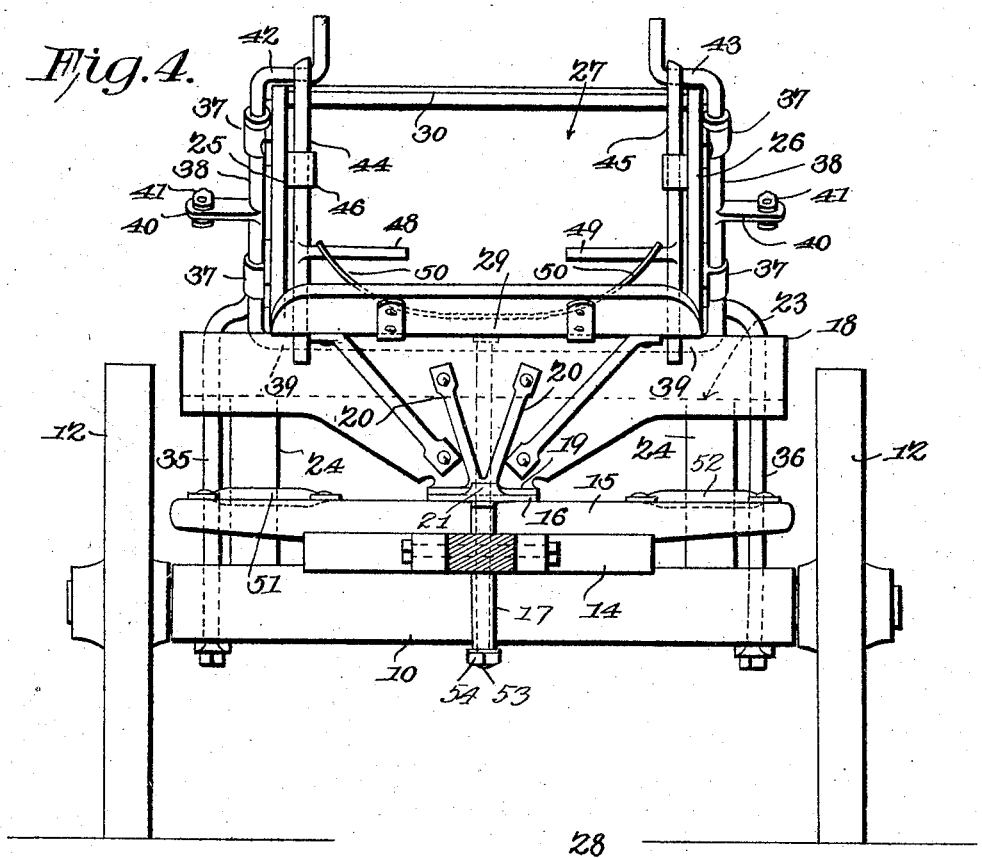

UNITED STATES PATENT OFFICE.

ADAM J. KOOB, OF CEDAR RAPIDS, IOWA.

DUMPING-WAGON.

No. 800,162.  Specification of Letters Patent.  Patented Sept. 26, 1905.

Application filed May 4, 1905. Serial No. 258,784.

*To all whom it may concern:*

Be it known that I, ADAM J. KOOB, a citizen of the United States, residing at Cedar Rapids, in the county of Linn and State of Iowa, have invented a new and useful Dump-Wagon, of which the following is a specification.

This invention relates to dump-wagons, and has for its object to improve the construction and increase the efficiency of devices of this character.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings, Figure 1 is a side elevation of the improved device. Fig. 2 is a detail of the safety "cramp" member to protect the swinging hopper-bottom members from injury. Fig. 3 is a sectional detail of the fifth-wheel construction. Fig. 4 is a front elevation of the improved apparatus. Fig. 5 is a transverse section on the line 5 5 of Fig. 1.

In the improved device is comprised a forward axle 10, rear axle 11, forward bearing-wheels 12, and rear bearing-wheels 13.

The tongue-hounds (represented at 14) do not extend rearwardly of the forward axle, as in ordinary wagons, as in the improved structure herein described and shown they would interfere with the dumping operations hereinafter explained.

Disposed upon the "sand-guard" member 15 of the forward axle is the brace member 16 of the fifth-wheel, the plate secured rigidly to the axle by a U-shaped strap 17, connected by the ends to the plate, and disposed upon the bolster member 18, which carries the box, is the upper plate 19 of the fifth-wheel, the latter rigidly connected to the bolster by diverging strap-bolts 20.

The lower fifth-wheel member 16 is provided with lips 21 22, overhanging the upper plate 19, to assist in retaining the plates in position.

The king-bolt 53 passes through the bolster 18, sand-guard 15, axle 10, and U-shaped strap 17 and is provided with a nut 54, bearing beneath the latter.

The bolster 18 is of greater vertical width than ordinarily used, and the rear bolster 23 is spaced above the rear axle to correspond thereto by vertical spacer members 24, as represented, so that the load receptacle or "box" will be high enough to permit the forward wheels to pass beneath the same when the vehicle is cramped for turning.

The load-receptacle comprises spaced sides 25 26, supported upon the bolsters 18 23 and secured to the latter by diagonal braces 35 36 and with inwardly-inclined ends 27 28 and with a platform 29 forward of the forwardly-inclined end 27 and with a transverse seat 30 above the platform. The bottom of the receptacle is formed in two sections 31 32, hinged at 33 34 to the lower edges of the side members 25 26 and swinging downwardly, as indicated by dotted lines in Figs. 1 and 5, to dump the load.

Mounted for rotation, as by spaced bearings 37, in inclined positions upon the side members 25 26, is a series of shafts 38, two at each side, and with the lower ends bent at right angles, as at 39, and extending beneath the hinged bottom members 31 32.

Each of the shafts 38 is provided with a lateral arm 40, and the arms of the shafts at each side are coupled, respectively, by rods 41 to cause the shafts on each side to move in unison.

The upper ends of the forward shafts 38 are bent into lateral cranks 42 43, adjacent to the seat 30 and convenient to the hands of the driver.

Vertical stop members 44 45 are disposed against the inner faces of the side members 25 26 and movable in keepers 46 47 and with lateral foot-treadles 48 49, the latter supported yieldably in upper position by a spring 50, bearing by its ends beneath the treadles, as shown in Fig. 3.

The crank-arms 42 43 are so disposed relative to the stop members 44 45 that the crank-arms will be engaged by the stop members when the lateral portions 39 of the shafts 38 extend beneath the hinged members 25 26 and at right angles thereto, as in Figs. 1, 4, and 5, and thus hold the bottom members in closed position, and then by depressing the foot-treadles 48 49 the shafts 38 will be released so that they can be rotated to throw the ends 39 around beneath the folded sections, the inclined position of the shafts causing the free ends of the arms to move downwardly as the shafts are rotated into the position shown in dotted lines in Figs. 1 and 5, and thus release the bottom members. Then by restoring the shafts 38 to their former position the bottom members will be again closed ready for another load.

The lateral ends 39 of the shafts 38 when in operative position and extending squarely across the hinged bottom members 25 26 receive all the strains in a downward direction, the weight of the load therefore not tending to release the crank-arms, so that a comparatively slight resistance only is required to hold the shafts in position.

Attached to the sand-guard member 15 are wear members 51 52 for engaging the members 25 26 and passing beneath them without injury, if the vehicle is "cramped" while the bottom members are in open or depressed position.

A guard member or shield 55 is attached to the bolster 18 and extending over the fifth-wheel structure to prevent the lodgement of material thereon when the load is discharged.

The device is simple in construction, can be inexpensively constructed, and applied to any of the purposes for which such apparatus is usually employed.

Having thus described the invention, what is claimed is—

1. In a dump-wagon, the body portion having hinged bottom leaves, and one or more shafts rotatively mounted and inclined to the transverse plane of the body and provided with lateral arms extending beneath said leaves.

2. In a dump-wagon, the body portion having hinged bottom leaves, and one or more shafts rotatively mounted and inclined to the transverse plane of the body and provided at one end with lateral arms extending beneath said leaves and with operating-levers at the other ends.

3. In a dump-wagon, the body portion having hinged bottom leaves, one or more shafts rotatively mounted and inclined to the transverse plane of the body and provided at one end with lateral arms extending beneath said leaves and with operating-levers at the other ends and springs for extending into the paths of said levers, and means under the control of the driver for operating said stop members.

4. In a dump-wagon, the body portion having hinged bottom leaves, one or more shafts rotatively mounted and inclined to the transverse plane of the body and provided at one end with lateral arms extending beneath said leaves and with operating-levers at the other ends, stop members movably disposed for extension into the path of said levers and provided with foot-rests, and springs operating to hold said stop members yieldably in operative position.

5. In a dump-wagon, the body portion having spaced sides and hinged bottom leaves, shafts spaced apart and mounted for rotation upon said sides and inclined to the transverse plane of the body, arms extending at one end laterally from said shafts beneath said leaves, crank-arms extending laterally from said shafts, connecting-rods between the crank-arms at each side of the body portion, and means for rotating said shafts.

6. In a dump-wagon, the body portion having spaced sides and hinged bottom leaves, shafts spaced apart and mounted for rotation upon said sides and inclined to the transverse plane of the body, arms extending at one end laterally from said shafts beneath said leaves, crank-arms extending laterally from said shafts, connecting-rods between the crank-arms at each side of the body portion, and an operating-lever connected to the other end of one of said shafts at each side.

7. In a dump-wagon, the body portion having hinged bottom leaves, means operative from said body portion for opening and closing said leaves, the forward axle rotative beneath said body portion, and brackets connected to said axle and extending rearwardly thereof for bearing against said leaves when depressed and passing beneath the same.

In testimony that I claim the foregoing as my own I have hereto affixed my signature in the presence of two witnesses.

ADAM J. KOOB.

Witnesses:
   John Buriamko,
   Chas. Kubias.